(12) United States Patent
Iijima (10) Patent No.: US 6,300,989 B1
(45) Date of Patent: Oct. 9, 2001

(54) DISPLAY DEVICE USING POLARIZED LIGHT SEPARATING MEANS AND ELECTRONIC APPARATUS USING THE SAME

(75) Inventor: Chiyoaki Iijima, Ina (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 09/242,252
(22) PCT Filed: Jun. 5, 1998
(86) PCT No.: PCT/JP98/02490
  § 371 Date: Feb. 11, 1999
  § 102(e) Date: Feb. 11, 1999
(87) PCT Pub. No.: WO98/57221
  PCT Pub. Date: Dec. 17, 1998

(30) Foreign Application Priority Data

Jun. 13, 1997 (JP) .................................................. 9-156720

(51) Int. Cl.$^7$ ................................................ G02F 1/1335
(52) U.S. Cl. ................................. 349/96; 349/98; 349/115
(58) Field of Search ............................... 349/96, 98, 117, 349/113, 115; 368/84, 242

(56) References Cited

U.S. PATENT DOCUMENTS

| | | | |
|---|---|---|---|
| 5,986,731 | 11/1999 | Iijima | 349/117 |
| 6,118,504 | 9/2000 | Iijima et al. | 349/96 |
| 6,124,905 | 9/2000 | Iijima | 349/62 |
| 6,141,068 | 10/2000 | Iijima | 349/96 |
| 6,181,399 | 1/2001 | Odoi et al. | 349/113 |
| 6,185,161 | 2/2001 | Arikawa et al. | 368/84 |

FOREIGN PATENT DOCUMENTS

| | | |
|---|---|---|
| 8-505480 | 6/1996 | (JP) . |
| 9-506984 | 7/1997 | (JP) . |
| 9-506985 | 7/1997 | (JP) . |
| WO95/17303 | 6/1995 | (WO) . |
| WO95/17691 | 6/1995 | (WO) . |
| WO95/17692 | 6/1995 | (WO) . |
| WO95/17699 | 6/1995 | (WO) . |
| WO95/27819 | 10/1995 | (WO) . |
| WO95/27919 | 10/1995 | (WO) . |
| WO96/19347 | 6/1996 | (WO) . |
| WO97/01439 | 1/1997 | (WO) . |
| WO97/01440 | 1/1997 | (WO) . |
| WO97/01610 | 1/1997 | (WO) . |
| WO97/01726 | 1/1997 | (WO) . |
| WO97/01774 | 1/1997 | (WO) . |
| WO97/01778 | 1/1997 | (WO) . |
| WO97/01780 | 1/1997 | (WO) . |
| WO97/01781 | 1/1997 | (WO) . |
| WO97/01788 | 1/1997 | (WO) . |
| WO97/01789 | 1/1997 | (WO) . |
| WO97/07653 | 2/1997 | (WO) . |

Primary Examiner—William L. Sikes
Assistant Examiner—Tarifur R. Chowdhury
(74) Attorney, Agent, or Firm—Harness, Dickey & Pierce, P.L.C.

(57) ABSTRACT

A polarizer 130, and a reflecting plate 195 are provided on the lower side of a TN liquid crystal 140, and a light-scattering layer 150 and a polarized light separator 160 are provided on the upper side of the TN liquid crystal in this order. The polarized light separator 160 reflects light which is in the direction of the reflection axis and in a certain wavelength region ($\Delta\lambda$), and transmits light which is in the direction of the reflection axis and in an other wavelength region ($-\Delta\lambda$). On a voltage non-application section 120, light in the direction parallel to a transmission axis 161 of the polarized light separator 160 is transmitted and is reflected by a reflecting plate 195, so that the display becomes bright. On a voltage application section 110, light which is in the direction perpendicular to the transmission axis 161 of the polarized light separator 160 and in the wavelength region ($-\Delta\lambda$) is transmitted, is reflected by the reflecting plate 195, and is diffused by the light-scattering layer 150 in the middle of passage, so that a color in the wavelength region ($-\Delta\lambda$) can be viewed in a wide visual angle.

19 Claims, 9 Drawing Sheets

DISPLAY DEVICE USING POLARIZED LIGHT SEPARATING MEANS AND ELECTRONIC APPARATUS USING THE SAME

TECHNICAL FIELD

The present invention relates to a technical field of a display device, and more particularly to a technical field of a display device such as a reflective liquid crystal display device or the like which includes a polarized light separator such as a polarizer, a reflective polarizer and so forth, and which reflects external light to effect display, and electronic apparatus such as a portable phone and a watch using the same.

BACKGROUND ART

In a conventional liquid crystal display device utilizing a variable transmission polarization axis optical element for rotating the polarization axis of transmitted light of a TN (Twisted Nematic) liquid crystal, an STN (Super-Twisted Nematic) liquid crystal and the like, a structure is employed in which the variable transmission polarization axis optical element is sandwiched by two sheets of polarizers.

According to such an arrangement, only a polarized light component in a specific direction is transmitted through a first polarizer located on the side of a display screen of liquid crystal, and other polarized light components are absorbed by this first polarizer. The polarization direction of the light transmitted through the first polarizer is selectively changed in response to an alignment state of liquid crystal that changes with respect to a voltage applied to the liquid crystal, and the light is incident on a second polarizer located on the other side of the liquid crystal.

In a normally white mode, for example, regarding each of the pixels, (i) in a state where a voltage is not applied to the liquid crystal, light emitted from this liquid crystal is transmitted through the second polarizer, is reflected by a reflecting plate located at the back thereof and thereafter, is transmitted through the second polarizer, the liquid crystal and the first polarizer again to be emitted as display light from the display screen of a liquid crystal display device, (ii) in a state where a voltage is applied to the liquid crystal, the light emitted from this liquid crystal is absorbed by the second polarizer, and the display light is not emitted from the display screen finally.

In this way, light amounts of the display light emitted from the display screen is controlled for each of the pixels using the liquid crystal, polarizers and so forth arranged on the optical path of the external light while reflecting the external light incident from the display screen by a reflecting film provided inside a device, whereby reflective display is effected.

However, since the polarizer, which is an example of a polarized light separator, effects polarization by absorbing polarized light component in the direction different from a specific polarization axis in the incident light, there is a problem in that usage efficiency of light is bad, thus providing dark reflective display.

SUMMARY OF THE INVENTION

The present invention is made in consideration of the above problem, and an object is to provide, in a display device utilizing a variable transmission polarization axis optical element such as liquid crystal or the like, a display device which can effect bright display at least at the time of reflective display and transmissive display using external light, and an electronic apparatus using the same.

The above object of the present invention is achieved by a display device including: a variable transmission polarization axis means capable of varying a transmission polarization axis; a first polarized light separating means which is placed on one side of the variable transmission polarization axis means, which transmits light of linearly polarized light component in a first direction and which reflects, of the light of linearly polarized light component in a predetermined direction different from the first direction, a component in a wavelength region $\Delta\lambda$ and transmits a component in a predetermined wavelength region $-\Delta\lambda$ different from the wavelength region $\Delta\lambda$; and a second polarized light separating means which is placed on the other side of the variable transmission polarization axis means, which transmits light of linearly polarized light component in a second direction, and which reflects or absorbs light of linearly polarized light component in a predetermined direction different from the second direction.

According to the display device of the present invention, when effecting reflective display utilizing external light, the external light is incident from the side of the first polarized light separating means. The first polarized light separating means transmits light of linearly polarized light component in the first direction in the incident external light to the side of the variable transmission polarization axis means. Then, the first polarized light separating means reflects light of the component in the wavelength region $\Delta\lambda$ in the linearly polarized light component in a predetermined direction (for example, the direction perpendicular or substantially perpendicular to the first direction) different from the first direction, and transmits light of the component in the wavelength region $-\Delta\lambda$ (for example, all visible light region except the wavelength region $\Delta\lambda$) different from this wavelength region $\Delta\lambda$. Next, the second polarized light separating means transmits, of the light incident through the first polarized light separating means and the variable transmission polarization axis means, light of linearly polarized light component in the second direction to the opposite side of the variable transmission polarization axis means, and reflects or absorbs light of linearly polarized light component in a predetermined direction (for example, the direction perpendicular or substantially perpendicular to the second direction) different from the second direction. Here, the light reflected by the second polarized light separating means passes through the variable transmission polarization axis means and the first polarized light separating means in inverse order of the above order. Or, the light separately reflected by a reflecting plate or the like after being transmitted through the second polarized light means passes through the second polarized light separating means, the variable transmission polarization axis means and the first polarized light separating means in inverse order of the above order. As a result of the foregoing, the light of one of the components in the wavelength region $-\Delta\lambda$ and in the all wavelength regions is selectively emitted from the first polarized light separating means in response to the direction of the transmission axis in the variable transmission polarization axis means. Then, together with the light emitted from the inside of the display device, the component in the wavelength region $\Delta\lambda$ in the linearly polarized light component in a predetermined direction of the incident external light is reflected by the first polarized light separating means without entering into the display device, and display becomes bright. However, the light of the component in the wavelength region $\Delta\lambda$ does not contribute to display contrast because it is reflected regardless of the direction of the transmission axis in the variable transmission polarization axis means.

In this way, the first polarized light separating means effects polarization separation by reflecting the component in the wavelength region Δλ in the linearly polarized light component of the incident external light in the predetermined direction. For this reason, the linearly polarized light component reflected by the polarized light separating means is utilized as display light, as compared with a conventional display device which uses a polarizer for effecting polarization separation by transmitting one linearly polarized light component in one direction and absorbing the other linearly polarized light component perpendicular to the one linearly polarized light component, so that bright reflective display can be obtained. In particular, regarding the first polarized light separating means, it is possible to effect reflective display of a desired color (for example, blue display on a white background) by selecting the wavelength region −Δλ at a designing level.

On the other hand, when effecting transmissive display utilizing a light source, light source light is incident from, for example, the side of the second polarized light separating means. The second polarized light separating means transmits light of the linearly polarized light component in the second direction in the incident light source light to the side of the variable transmission polarization axis means, and reflects or absorbs light of the linearly polarized light component in a predetermined direction different from the second direction. Furthermore, the first polarized light separating means transmits, of the light incident through the second polarized light separating means and the variable transmission polarization axis means, light of the linearly polarized light in the first direction toward the opposite side of the variable transmission polarization axis means. Then, the first polarized light separating means reflects light of the component in the wavelength region Δλ in the linearly polarized light component in a predetermined direction different from the first direction, and transmits light of the component in the wavelength region −Δλ. As a result of the foregoing, the light of one of the components in the wavelength region −Δλ and in the all wavelength regions is selectively emitted from the first polarized light separating means in response to the direction of the transmission axis in the variable transmission polarization axis means. Incidentally, the relationship between the emitted light source light and the direction of the transmission axis in the variable transmission polarization axis means is reversed as compared with the above-described case where the reflective display is effected (that is, so-called positive-negative inversion takes place). In addition, also in this case, together with the light source light emitted from the inside of the display device, the component in the wavelength region Δλ in the linearly polarized light component in a predetermined direction of the incident external light is reflected from the first polarized light separating means without entering into the display device, and display becomes bright.

As a result of the foregoing, by the display device of the present invention, it is possible to effect reflective or transmissive bright display that uses at least the external light.

According to one form of the display device of the present invention, the second polarized light separating means consists of a polarizer which transmits light of linearly polarized light component in the second direction and absorbs light of linearly polarized light component in the direction perpendicular to the second direction.

According to this form, the polarizer transmits the linearly polarized light component in the second direction in the incident light as the linearly polarized light component in the second direction, and absorbs the linearly polarized light component in the direction perpendicular to the second direction. Therefore, display can be effected on the basis of the light transmitted through the polarizer.

According to this form, a reflecting means may be further included on the side opposite to the variable transmission polarization axis means with respect to the second polarized light separating means.

With this arrangement, the light transmitted through the second polarized light separating means is reflected by the reflecting means. Therefore, the light reflected by the reflecting means is selectively emitted as display light from the side of the first polarized light separating means through the second polarized light separating means and the variable transmission polarization axis means, so that sharp reflective display can be effected.

According to another form of the display device of the present invention, the first polarized light separating means consists of a reflective polarizer which transmits light of linearly polarized light component in the first direction, and which reflects light of the component in the wavelength region Δλ in the linearly polarized light component in the direction perpendicular to the first direction.

According to this form, the reflective polarizer transmits the linearly polarized light component in the first direction in the incident light as the linearly polarized light component in the first direction. Then, the polarizer reflects, of the light of the linearly polarized light component in the direction perpendicular to the first direction, the component in the wavelength region Δλ as the linearly polarized light component in the perpendicular direction, and transmits the component in the wavelength region −Δλ in the perpendicular direction as the linearly polarized light component in the perpendicular direction. Therefore, when the external light is incident, the component in the wavelength region −Δλ transmitted through the reflective polarizer is emitted as display light from the first polarized light separating means through the variable transmission polarization axis means and the second polarized light separating means, and display of a specific color is effected. Or, when the light source light is incident from the side of the second polarized light separating means, the component in the wavelength region −Δλ transmitted through the reflective polarizer is selectively emitted as display light, and display of a specific color is effected.

Furthermore, in this form, the reflective polarizer may consist of a laminated product in which a first layer having birefringence and a second layer having a refractive index that is substantially equal to any one of a plurality of refractive indexes of the first layer, and having no birefringence are alternately laminated.

In the reflective polarizer constructed as described above, the light of linearly polarized light component in the first direction in the light incident on one main surface of the reflective polarizer from the lamination direction is transmitted as light of linearly polarized light component in the first direction to the opposite side of the other main surface. Then, of the light of linearly polarized light component in the direction perpendicular to the first direction, the component in the wavelength region Δλ is reflected as light of linearly polarized light component in the perpendicular direction, and the component in the wavelength region −Δλ is transmitted as linearly polarized light component in the perpendicular direction. In addition, the light of linearly polarized light component in the first direction in the light incident on the other main surface of the reflective polarizer from the lamination direction is transmitted as light of linearly polarized light component in the first direction to the opposite side of one main surface. Then, of the light of linearly polarized light component in the direction perpendicular to the first direction, the component in the wavelength region Δλ is reflected as light of linearly polarized light component in the perpendicular direction, and the component in the wavelength region −Δλ is transmitted as light of linearly polarized light component in the perpendicular direction.

According to a still another form of the display device of the present invention, the second polarized light separating means consists of a reflective polarizer which transmits light of linearly polarized light component in the second direction, and which reflects light of linearly polarized light component in the direction perpendicular to the second direction.

According to this form, the reflective polarizer transmits the linearly polarized light component in the second direction in the incident light as the linearly polarized light component in the second direction. In addition, the reflective polarizer reflects the linearly polarized light component in the direction perpendicular to the second direction as linearly polarized light component in the perpendicular direction. Therefore, display can be effected on the basis of the light transmitted by the reflective polarizer.

Furthermore, in this form, the reflective polarizer may consist of a laminated product in which a first layer having birefringence and a second layer having a refractive index that is substantially equal to any one of a plurality of refractive indexes of the first layer, and having no birefringence are alternately laminated.

In the reflective polarizer constructed as described above, the light of linearly polarized light in the second direction in the light incident on one main surface of the reflective polarizer from the lamination direction is transmitted as light of linearly polarized light component in the second direction to the opposite side of the other main surface. Then, the light of linearly polarized light component in the direction perpendicular to the second direction is reflected as light of linearly polarized light component in the perpendicular direction. In addition, the light of linearly polarized light component in the second direction in the light incident on the other main surface of the reflective polarizer from the lamination direction is transmitted as light of linearly polarized light component in the second direction to the opposite side of the one main surface. Then, the light of linearly polarized component in the direction perpendicular to the second direction is reflected as light of linearly polarized light component in the perpendicular direction.

In this form of the second polarized light separating means constituted by the reflective polarizer, a light-absorbing means may be further included on the side opposite to the variable transmission polarization axis means with respect to the second polarized light separating means.

According to this form, when the external light is incident from the side of the first polarized light separating means as described above, of the light transmitted through the first polarized light separating means, light transmitted through the second polarized light separating means is absorbed by the light-absorbing means. Therefore, the light transmitted through the second polarized light separating means can be prevented from being mixed to the light reflected by the second polarized light separating means to be emitted, so that sharp reflective display can be effected.

According to a further form of the display device of the present invention, a transmissive light-scattering layer is further included between the first polarized light separating means and the variable transmission polarization axis means.

According to this form, display which is not in the form of a mirror surface (but in the form of a paper) can be effected by the light which is transmitted through the first polarized light separating means, and is emitted as display light.

According to a still further form of the display device of the present invention, a transmissive light-scattering layer is further included between the variable transmission polarization axis means and the second polarized light separating means.

According to this form, display which is not in the form of a mirror surface (but in the form of a paper) can be effected by the light which is transmitted through the first polarized light separating means, and is emitted as display light.

According to another form of the display device of the present invention, a light source for illuminating the variable transmission polarization axis means is further included.

According to this form, on one hand, it is possible to effect reflective display mainly utilizing the external light in a bright place, and on the other hand, it is possible to effect transmissive display mainly utilizing a light source such as backlight or the like in a dark place. In the latter case, the light from the light source may be transmitted through the first and the second polarized light separating means as described above so as to be emitted as display light.

According to a further form of the display device of the present invention, the variable transmission polarization axis means includes a liquid crystal device. That is, the display device is constructed as a liquid crystal display device.

In this case, the liquid crystal device may be a TN liquid crystal device, an STN liquid crystal device, or an ECB (Electrically Controlled Birefringence) liquid crystal device. With this arrangement, bright reflective display of high quality can be effected with relative ease. Incidentally, the STN liquid crystal device includes an STN liquid crystal device using a color compensating optical anisotropic body.

The above object of the present invention is also achieved by an electronic apparatus including the above-described display device of the present invention.

According to the electronic apparatus of the present invention, since the above-described display device of the present invention is included, various types of electronic apparatuses capable of effecting at least reflective and transmissive bright display by the external light can be realized. Incidentally, the display device in any one of the above-described forms may be incorporated into the electronic apparatus of the present invention in some applications thereof.

The above object of the present invention is also achieved by a display device including: a variable transmission polarization axis means capable of varying a transmission polarization axis; a first polarized light separating means which is placed on one side of the variable transmission polarization axis means, which transmits light of linearly polarized light component in a first direction, and which reflects light of linearly polarized light component in a predetermined direction different from the first direction; and a second polarized light separating means which is placed on the other side of the variable transmission polarization axis means, which transmits light of linearly polarized light component in a second direction, and which reflects or absorbs light of linearly polarized light component in a predetermined direction different from the second direction.

According to this form, the first polarized light separating means transmits light of linearly polarized light component in the first direction in the incident light, and reflects light of linearly polarized light component in a predetermined direction (for example, the direction perpendicular or substantially perpendicular to the first direction) different from the first direction. Next, the second polarized light separating means transmits, of the incident light, light of linearly polarized light component in the second direction, and reflects or absorbs light of linearly polarized light component in a predetermined direction (for example, the direction perpendicular or substantially perpendicular to the second direction) different from the second direction. As a result of the foregoing, light of the component in all wavelength regions is selectively emitted from the first polarized light separating means in response to the direction of the transmission axis in the variable transmission polarization axis means or no light is emitted. That is, it corresponds to a case where the wavelength region $\Delta\lambda$ includes at least the all visible light regions, and the wavelength region $-\Delta\lambda$ is not present in at least the visible light region in the above-described present invention.

In this way, the first polarized light separating means effects polarization separation by reflecting the component of the linearly polarized light component different from the first linearly polarized light component in the incident light. For this reason, the linearly polarized light component reflected by the polarized light separating means is utilized as display light, as compared with a conventional display device which uses a polarizer for effecting polarization separation by transmitting one linearly polarized light component in one direction and absorbing the other linearly polarized light component perpendicular to the one linearly polarized light, so that bright reflective display (for example, black display on a white background) can be obtained.

On the other hand, when effecting transmissive display utilizing a light source, light source light is incident from, for example, the side of the second polarized light separating means. The second polarized light separating means transmits light of the linearly polarized light component in the second direction in the incident external light to the side of the variable transmission polarization axis means, and reflects or absorbs light of the linearly polarized light component in a predetermined direction different from the second direction. Next, the first polarized light separating means transmits, of the light incident through the second polarized light separating means and the variable transmission polarization axis means, light of the linearly polarized light component in the first direction to the opposite side of the variable transmission polarization axis means, and reflects light of the linearly polarized light component in a predetermined direction different from the first direction. As a result of the foregoing, light of the component in all wavelength regions is selectively emitted from the first polarized light separating means in response to the direction of the transmission axis in the variable transmission polarization axis means or no light is emitted. Incidentally, in this case, the negative-positive inversion also takes place.

As a result of the foregoing, by the display device of the present invention, it is possible to effect reflective or transmissive bright display which uses at least the external light.

The above object of the present invention is also achieved by a display device including: a variable transmission polarization axis optical element; a first polarized light separator which is placed on one side of the variable transmission polarization axis optical element and which is of a type for effecting polarization separation by reflection; and a second polarized light separator which is placed on the other side of the variable transmission polarization axis optical element and which is of a type for effecting polarization separation by reflection or absorption.

According to this display device, at least the first polarized light separator effects polarization separation by reflection, that is, by reflecting the linearly polarized light component in the direction different from a predetermined direction, so that bright display by the external light can be obtained, as compared with a conventional display device using a plurality of polarizers for effecting polarization separation by absorption.

Incidentally, even if the display device of the present invention as described above is constructed as the display device of any known driving system, such as a passive matrix system, an active matrix system using TFT (Thin Film Transistor) and TFD (Thin Film Diode), a segment system and so forth, bright reflective display can be realized.

In addition, as the polarized light separating means of the present invention, in addition to the above reflective polarizer, for example, means of a combination of cholesteric liquid crystal layer and $(¼)\lambda$ plate, means for separating into reflected polarized light and transmitted polarized light utilizing Brewster angle (pages 427 to 429 of SID 92 DIGEST), means utilizing a hologram, means disclosed in the international-published international applications (International Publication Nos.: WO95/27819 and WO95/17692) and so forth may be used. Incidentally, these various types of polarized light separators can be similarly used in place of the reflective polarizer in the embodiments to be described later.

BEST MODE FOR CARRYING OUT THE INVENTION

Hereinafter, the best mode for carrying out the present invention will be described for each of the embodiments on the basis of the drawings.

(Principle of Operation)

First, the principle of operation of a liquid crystal display device according to respective embodiments of the present invention will be described with reference to FIGS. 1 to 4.

Figure 1:
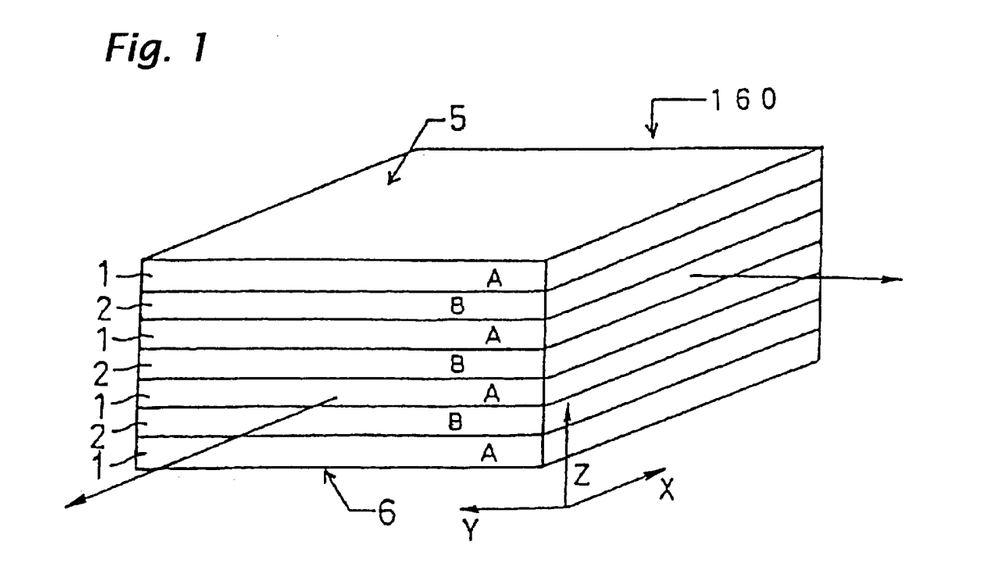
FIG. 1 is a schematic perspective view of a reflective polarizer for use in a display device of respective embodiments of the present invention.

FIG. 1 is a schematic perspective view of a reflective polarizer, which is an example of a polarized light separator for use in the respective embodiments of the present invention. Incidentally, a basic configuration of such a reflective polarizer is disclosed in Japanese Patent Laid-Open No. 9-506985 (International application gazette No.: WO/95/17692) and International application gazette No.: WO/95/27819.

A polarized light separator 160 has a structure of a plurality of layers formed by alternately laminating two different layers 1 (A layers) and 2 (B layers). The refractive index (nAX) in the X direction and the refractive index (nAY) in the Y direction of the A layers 1 are different from each other. The refractive index (nBX) in the X direction and the refractive index (nBY) in the Y direction of the B layers 2 are equal to each other. In addition, the refractive index (nAY) in the Y direction of the A layers 1 and the refractive index (nBY) in the Y direction of the B layers 2 are equal to each other.

Therefore, linearly polarized light in the Y direction in the light incident on the polarized light separator 160 from the direction perpendicular to the top surface 5 of this polarized light separator 160 is transmitted through this polarized light separator 160 to be emitted from the lower surface 6 as linearly polarized light in the Y direction. Conversely, linearly polarized light in the Y direction in the light incident on the polarized light separator 160 from the direction perpendicular to the lower surface 6 of the polarized light separator 160 is transmitted through the polarized light separator 160 to be emitted from the top surface 5 as linearly polarized light in the Y direction. Here, the direction to be transmitted (the Y direction in this example) is called a transmission axis.

On the other hand, if the thickness of the A layer 1 in the Z direction is taken as tA, the thickness of the B layer 2 in the Z direction is taken as tB, and the wavelength of the incident light is taken as $\lambda$, by setting them to satisfy the following, $$tA \cdot nAX + tB \cdot nBX = \lambda/2 \qquad (1)$$

linearly polarized light in the X direction in the light having the wavelength $\lambda$ incident on the polarized light separator 160 from the direction perpendicular to the top surface 5 of the polarized light separator 160 is reflected by the polarized light separator 160 as linearly polarized light in the X direction. Furthermore, linearly polarized light of the light of wavelength $\lambda$ on the lower surface 6 of the polarized light separator 160 is reflected by the polarized light separator 160 as a linearly polarized light in the X direction. Here, the direction to be reflected (the X direction in this example) is called a reflection axis.

By variously changing the thickness tA of the A layer 1 in the Z direction and the thickness tB of the B layer 2 in the Z direction to allow the above (1) to be held over a certain wavelength range of visible light, only light in a certain wavelength region ($\Delta\lambda$) is reflected and light in other wavelength region ($-\Delta\lambda$) is transmitted. That is, the linearly polarized light component in the Y direction is transmitted as the linearly polarized light in the Y direction, light which is linearly polarized light component in the X direction and in a certain wavelength region ($\Delta\lambda$) is reflected as linearly polarized light in the X direction, and light which is linearly polarized light component in the X direction and in other wavelength region ($-\Delta\lambda$) is transmitted as linearly polarized light in the X direction.

Figure 2:
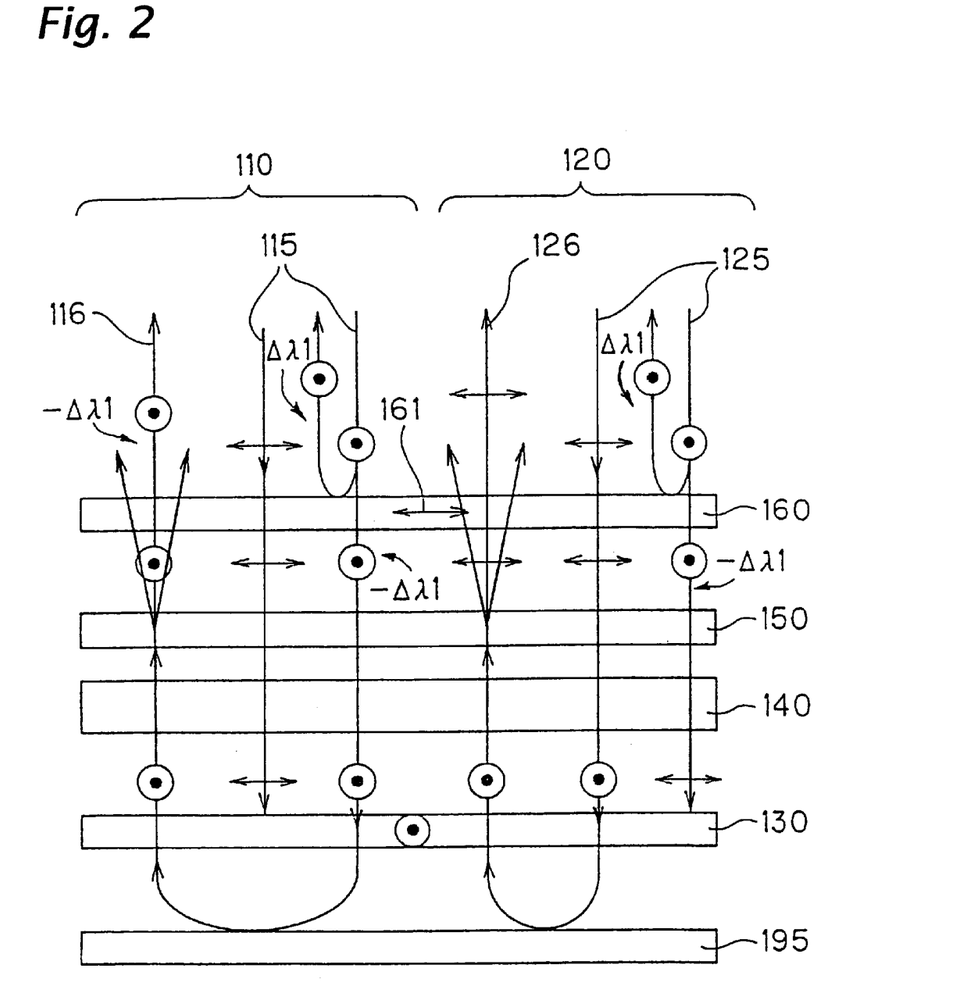
FIG. 2 is a view for explaining one principle of operation in the respective embodiments of the present invention.

FIG. 2 is a view for explaining the display device of the present invention. Incidentally, a liquid crystal display device shown in this drawing is used only for explaining the principle of the present invention, and it is needless to say that the present invention is not limited to the liquid crystal display device shown in these drawings.

As shown in FIG. 2, in this liquid crystal display device, a TN liquid crystal 140 is used as the variable transmission polarization axis optical element. A polarizer 130 and a reflecting plate 195 are provided on the lower side of the TN liquid crystal 140. On the upper side of the TN liquid crystal, a light-scattering layer 150 and a polarized light separator 160 are provided in this order. The polarized light separator 160 reflects light which is in the direction of the reflection axis and in a certain wavelength region ($\Delta\lambda 1$) and transmits light which is in the direction of the reflection axis and in other wavelength region ($-\Delta\lambda 1$).

The principle of operation of this liquid crystal display device will be described with reference to FIG. 2 taking the left side of this liquid crystal display device as a voltage application section 110, and taking the right side as a voltage non-application section 120.

On the right-side voltage non-application section 120, light in the direction perpendicular to a transmission axis 161 of the polarized light separator 160 and in the wavelength region ($-\Delta\lambda 1$) in light 125 incident as external light is transmitted by the polarized light separator 160 as linearly polarized light. The polarization direction of the transmitted light is twisted 90° by the TN liquid crystal 140 and the light becomes linearly polarized light in the direction parallel to the plane of the drawing, and is absorbed by the polarizer 130. On the other hand, light in the direction parallel to the transmission axis 161 of the polarized light separator 160 in the light 125 is transmitted by the polarized light separator 160 as linearly polarized light. The polarization direction thereof is twisted 90°, and the light becomes linearly polarized light in the direction perpendicular to the plane of the drawing, is transmitted through the polarizer 130, and is reflected by the reflecting plate 195. The light passes through the polarizer 130, the TN liquid crystal 140, and the polarized light separator 160 again. Since the light-scattering layer 150 is provided, the light is diffused thereby in the middle of passage, and is changed from the form of a mirror surface to the form of a white surface.

On the left-side voltage application section 110, light which is in the direction perpendicular to the transmission axis 161 of the polarized light separator 160 and in the wavelength region ($-\Delta\lambda 1$) in incident light 115 is transmitted by the polarized light separator 160 as linearly polarized light. The transmitted light becomes linearly polarized light in the direction perpendicular to the plane of the drawing without the change of the polarization direction by the TN liquid crystal 140, is transmitted through the polarizer 130, and is reflected by the reflecting plate 195. The light passes through the polarizer 130, the TN liquid crystal 140 and the polarized light separator 160 again. Since the light-scattering layer 150 is provided, the light is diffused thereby in the middle of passage and can be viewed in a wide visual angle. On the other hand, light in the direction parallel to the transmission axis 161 of the polarized light separator 160 in the light 115 is transmitted by the polarized light separator 160 as linearly polarized light. The transmitted light becomes linearly polarized light in the direction parallel to the plane of the drawing without the change of the polarization direction by the TN liquid crystal 140, and is absorbed by the polarizer 130. That is, a color of the wavelength region (−Δλ1) can be viewed.

In this way, on the voltage non-application section 120, a white color can be viewed, and a color in the wavelength region (−Δλ1) can be viewed on the voltage application section 110.

Incidentally, although a description is given taking the TN liquid crystal 140 as an example in the above description, the basic principle of operation is equal even if the STN liquid crystal, the ECB (Electrically Controlled Birefringence) liquid crystal or the like capable of changing the transmitted polarization axis by a voltage or the like, is used in place of the TN liquid crystal 140.

Figure 3:
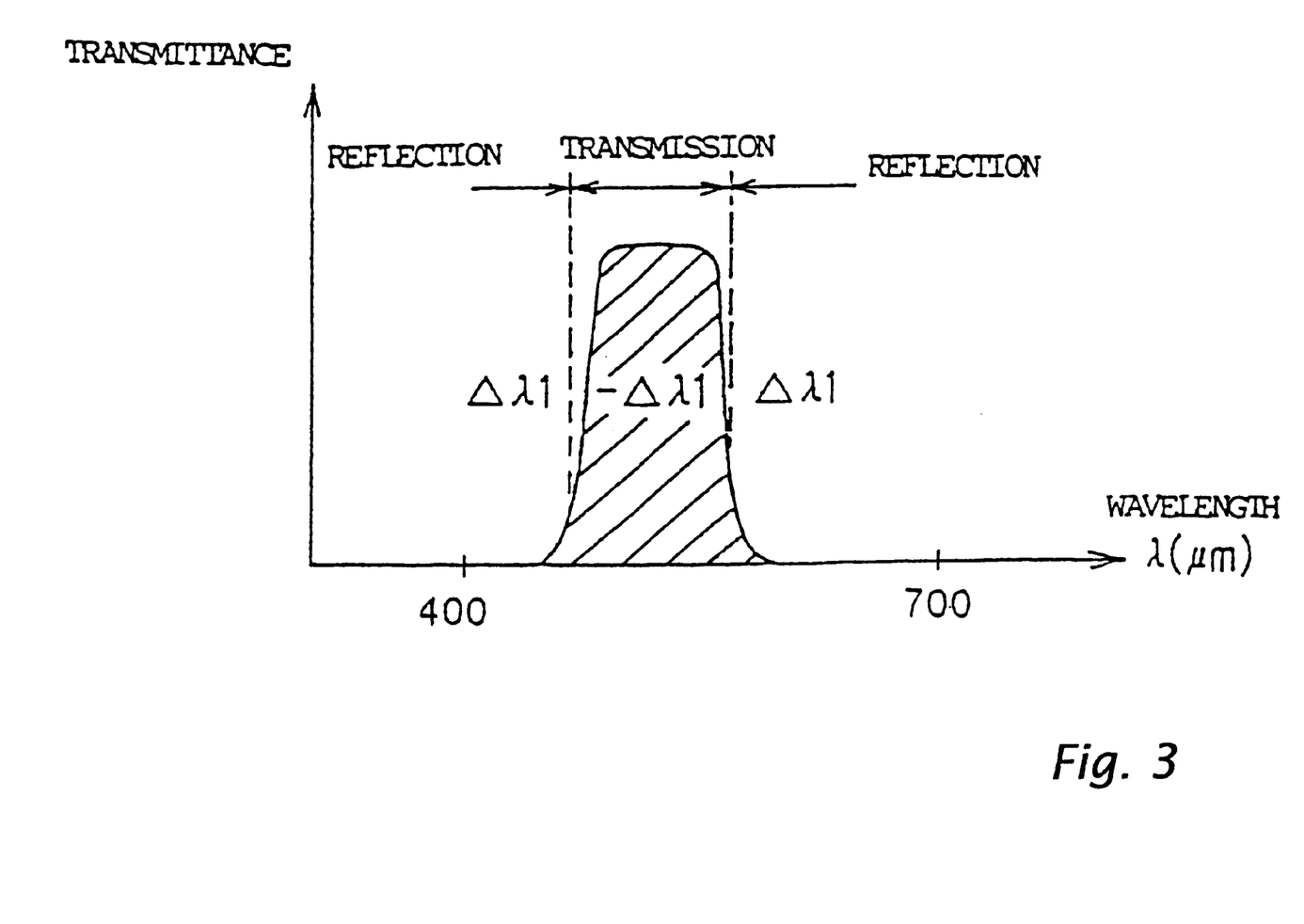
FIG. 3 is a characteristic diagram showing transmittance characteristics of a polarized light separator shown in FIG. 2 with respect to wavelength.

FIG. 3 shows transmittance characteristics of the above-described polarized light separator 160 with respect to the wavelength.

As shown in FIG. 3, the polarized light separator 160 reflects the light of which the polarization direction is perpendicular to the plane of the drawing in FIG. 2 in the wavelength region (Δλ1) where the above expression (1) is held, and transmits the above light in the wavelength region (−Δλ1) where the above expression (1) is not held. In this case, the polarized light separator 160 transmits the light which does not hold the above expression (1) and the polarization direction thereof is parallel to the plane of the drawing in FIG. 2 together with the wavelength region (−Δλ1).

As will be understood from FIG. 3, according to the present invention, the external light incident from the upper side of the polarized light separator 160 in FIG. 2 is selectively reflected by the polarized light separator 160, thereby being emitted to the upper side of the polarized light separator 160 as white light in all wavelength regions or display light in the wavelength region (−Δλ1) in response to the voltage applied on the TN liquid crystal, and reflective display is effected. In this case, the light in the wavelength region (Δλ1) in the light 125 is reflected by the polarized light separator 160 to provide bright display. That is, the light in this wavelength region (Δλ1) is reflected by both of the voltage application section 110 and the voltage non-application section 120 to provide a bright display. However, since the same light is reflected by both sections, the reflection does not contribute to display contrast. In addition, even if the characteristic curve shown in FIG. 3 changes not steeply but gently, that is, even if the transmittance changes from 0% to 100% in a wide transition region, such a reflective display can be effected. Furthermore, even if a polarized light separator having a high-pass filter or a low-pass filter characteristic curve unlike the band-pass filter characteristic curve as shown in FIG. 3 is used, the reflective display can be effected.

Figure 4:
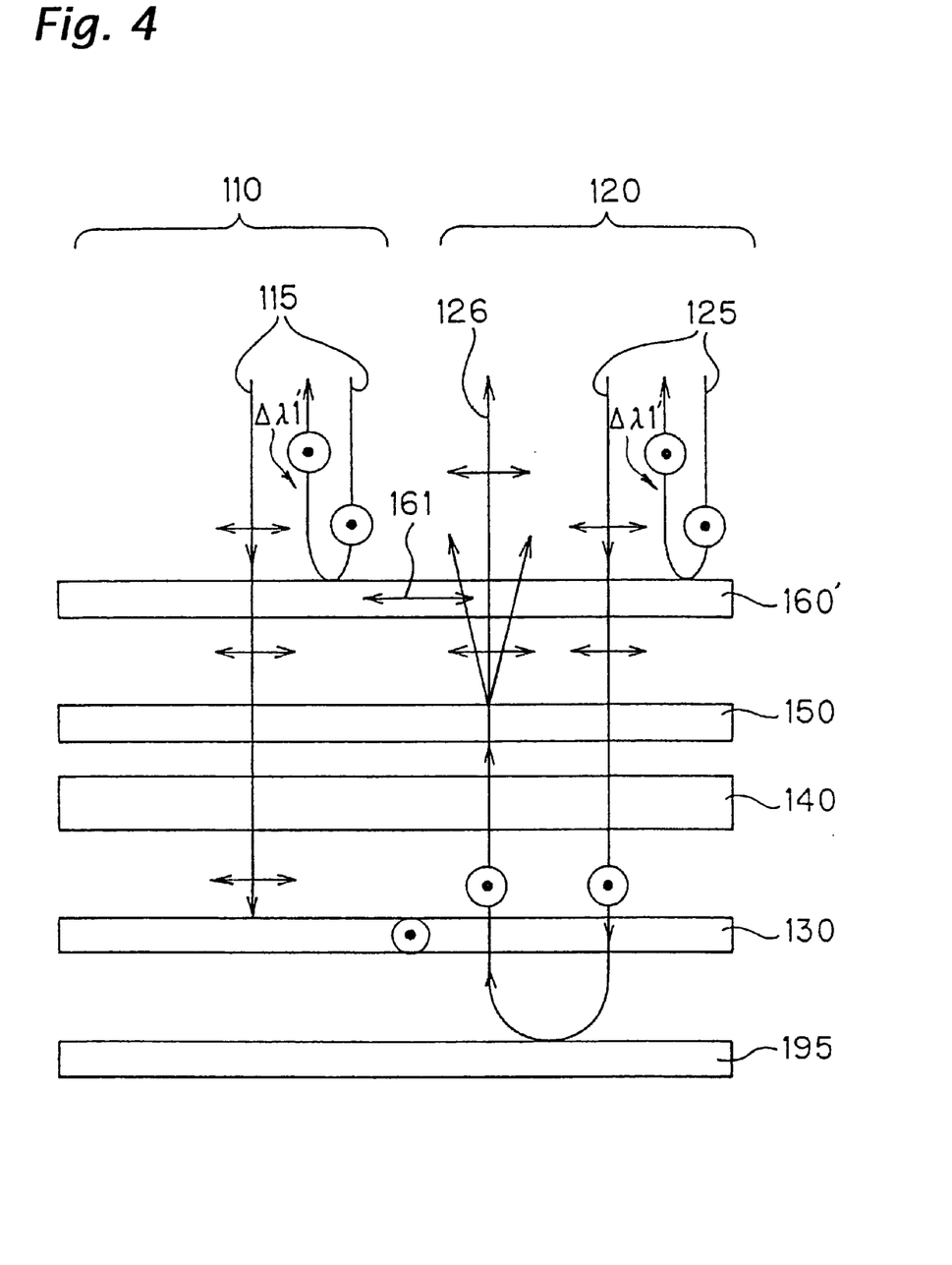
FIG. 4 is a view for explaining another principle of operation in the respective embodiments of the present invention.

FIG. 4 is a view for explaining another principle of operation using the polarized light separator in the embodiment of the present invention.

As shown in FIG. 4, in this liquid crystal display device, a polarized light separator 160', reflects light which is in the direction of the reflection axis thereof and is at least in all visible light region (Δλ1), and transmits light in the direction of the transmission axis. That is, the principle of operation shown in FIG. 4 corresponds to a case where the light of the component in the wavelength region (−Δλ1) in the direction of the reflection axis in the drawing of the principle of the operation explained with reference to FIG. 2 is set to "zero". In FIG. 4, the same components as those of FIG. 2 are indicated by the same reference numerals, and the explanation thereof will be omitted.

The principle of operation of this liquid crystal display device will be described with reference to FIG. 4 taking the left side of this liquid crystal display device is taken as a voltage application section 110, and taking the right side as a voltage non-application section 120.

On the right-side voltage non-application section 120, light in the direction parallel to the transmission axis 161 of the polarized light separator 160' in light 125 incident as external light is transmitted by the polarized light separator 160' as linearly polarized light. The polarization direction is twisted 90° by the TN liquid crystal 140, and the light becomes linearly polarized light in the direction perpendicular to the plane of the drawing, is transmitted through the polarizer 130, and is reflected by the reflecting plate 195. The light passes through the polarizer 130, the TN liquid crystal 140 and the polarized light separator 160' again. Since the light-scattering layer 150 is provided, the light is diffused thereby in the middle of passage, and is changed from the form of a mirror surface to the form of a white surface.

On the left-side voltage application section 110, light in the direction parallel to the transmission axis 161 of the polarized light separator 160' in the light 115 is transmitted by the polarized light separator 160' as linearly polarized light. The transmitted light becomes linearly polarized light in the direction parallel to the plane of the drawing without the change of the polarization direction by the TN liquid crystal 140, and is absorbed by the polarizer 130. That is, a dark black color can be viewed through the TN liquid crystal 140.

In this way, on the voltage non-application section 120, a white color can be viewed, and a dark black color can be viewed on the voltage application section 110.

As a result of the foregoing, bright reflective display (for example, black display on a white background) using external light is effected by the principle of the operation which is explained with reference to FIG. 4.

Various embodiments of the display device operated on the basis of the principle as described above will be described as follows.

(First Embodiment)

Figure 5:
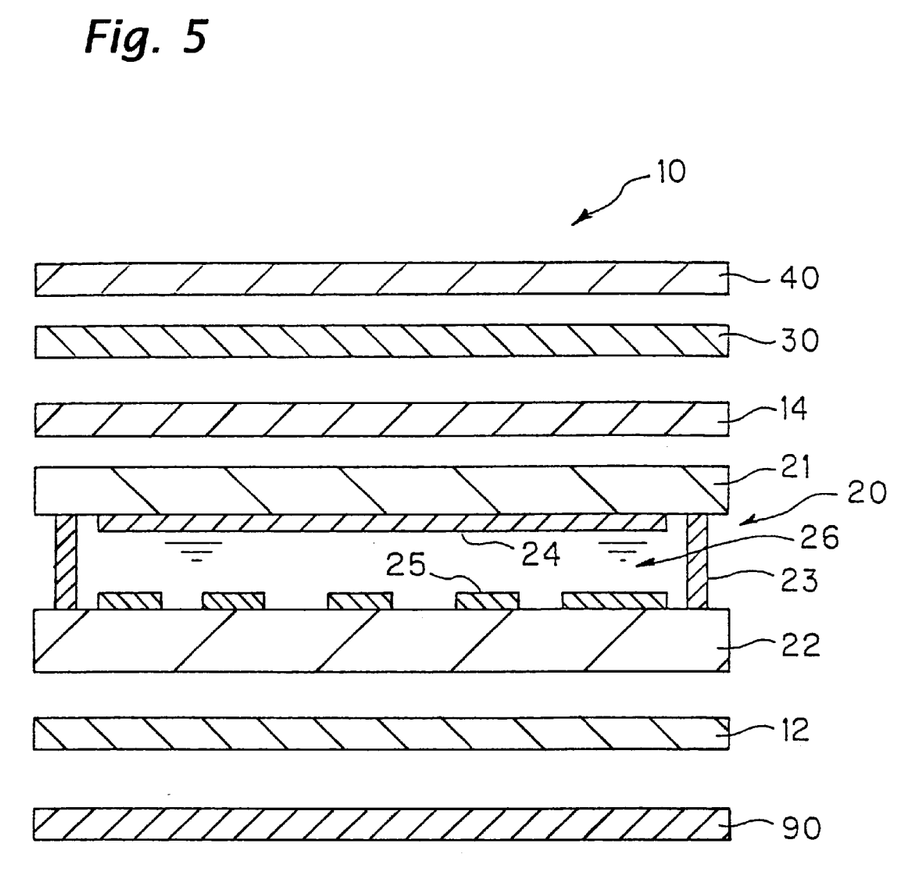
FIG. 5 is an exploded sectional view for explaining a liquid crystal display device of a first embodiment of the present invention.

A description will be given of a liquid crystal display device of a first embodiment of the present invention with reference to FIG. 5. FIG. 5 is an exploded sectional view for explaining the liquid crystal display device of the first embodiment of the present invention.

As shown in FIG. 5, in a liquid crystal display device 10 of the first embodiment, an STN cell 20 is used as the variable transmission polarization axis optical element. On the upper side of the STN cell 20, a retardation film 14, a diffusing plate 30 and a polarized light separator 40 are provided in this order. On the lower side of the STN cell 20, a polarizer 12 and a reflecting plate 90 are provided in this order.

As the polarized light separator 40, the polarized light separator which is explained using FIG. 1 (that is, the reflective polarizer) is used. The polarized light separator 40 is the polarized light separator for holding the above expression (1) regarding only a specific wavelength region (Δλ2) in the visible light, transmitting linearly polarized light in the Y direction as the linearly polarized light in the Y direction, reflecting light in the wavelength region (Δλ2) of linearly polarized light in the X direction as the linearly polarized light in the X direction, and transmitting light in the wavelength region (−Δλ2) other than the wavelength region (Δλ2) of linearly polarized light in the X direction as the linearly polarized light in the X direction.

In the STN cell 20, STN liquid crystal 26 is sealed in a cell formed by two sheets of glass substrates 21 and 22 and a sealing member 23. A transparent electrode 24 is provided on the lower surface of the glass substrate 21, and transparent electrodes 25 are provided on the upper surface of the glass substrate 22. As the transparent electrodes 24 and 25, ITO (Indium Tin Oxide) and stannic oxide can be used. The retardation film 14 is used as a color compensating optical anisotropic body, and is used to correct coloring caused in the STN cell 20. In general, the reflecting plate 90 employs an aluminum-evaporated plate, but an aluminum foil plate, a layer having micropearls dispersed thereon may be employed.

The principle of operation of the liquid crystal display device 10 of this embodiment is the same as the case of FIG. 2. This allows the light to be viewed in white color at the time of not applying a voltage, and allows the light to be viewed in a color of the wavelength region ($-\Delta\lambda 2$) at the time of applying a voltage.

Here, blue was selected as the color of the wavelength region ($-\Delta\lambda 2$). Blue display on a bright white background was obtained. As comparison, a blue color polarizer was used in place of the diffusing plate 30 and the polarized light separator 40. Although blue display on the white background was obtained, the white background was tinged with blue to become dark. Perhaps this is because the blue color polarizer accompanies absorption of light, while the polarized light separator does not accompany the absorption.

(Second Embodiment)

Figure 6:
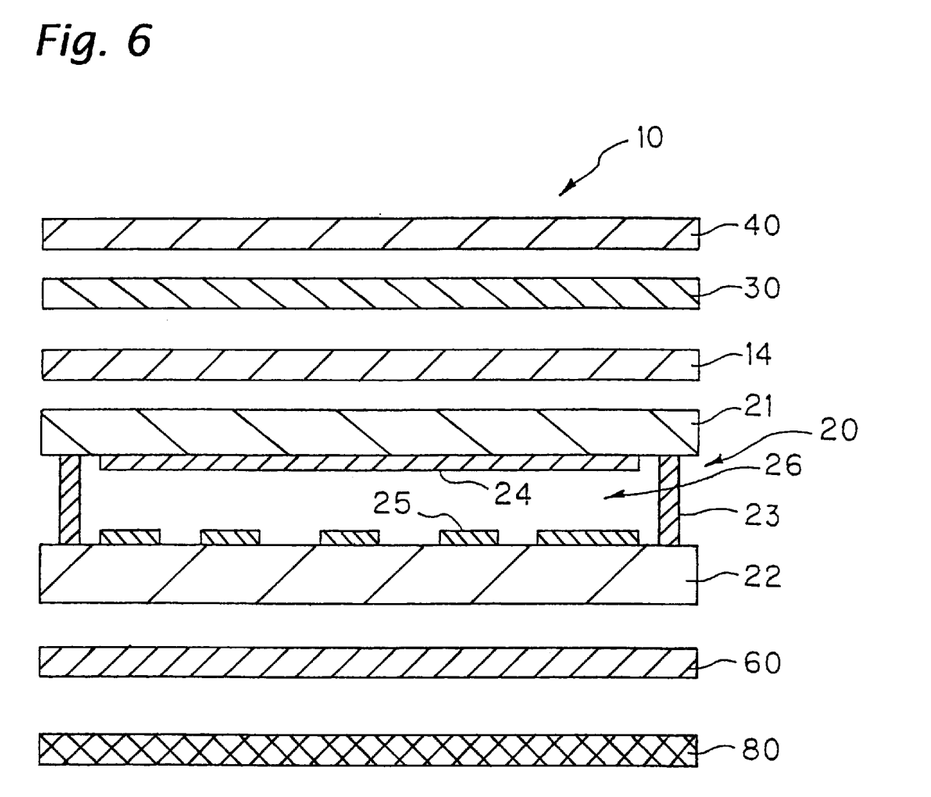
FIG. 6 is an exploded sectional view for explaining a liquid crystal display device of a second embodiment of the present invention.

A description will be given of a liquid crystal display device of a second embodiment of the present invention with reference to FIG. 6. FIG. 6 is an exploded sectional view for explaining the liquid crystal display device of the second embodiment of the present invention.

In the second embodiment, a polarized light separator 60 and a light absorber 80 are employed in place of the polarizer 12 and the reflecting plate 90 in the above-described first embodiment. The polarized light separator 60 is the polarized light separator (that is, the reflective polarizer) for holding the above expression (1) in the visible wavelength region, transmitting linearly polarized light in the Y direction as the linearly polarized light in the Y direction, and reflecting linearly polarized light in the X direction as the linearly polarized light in the X direction. The light absorber 80 absorbs the linearly polarized light in the Y direction transmitted from the polarized light separator 60. Other arrangements are the same as those of the first embodiment shown in FIG. 5.

According to the second embodiment, results similar to those of the above-described first embodiment can be obtained and further, the light reflected from the polarized light separator 60 contributes to display, so that reflective display brighter than that of the first embodiment can be effected.

(Third Embodiment)

Figure 7:
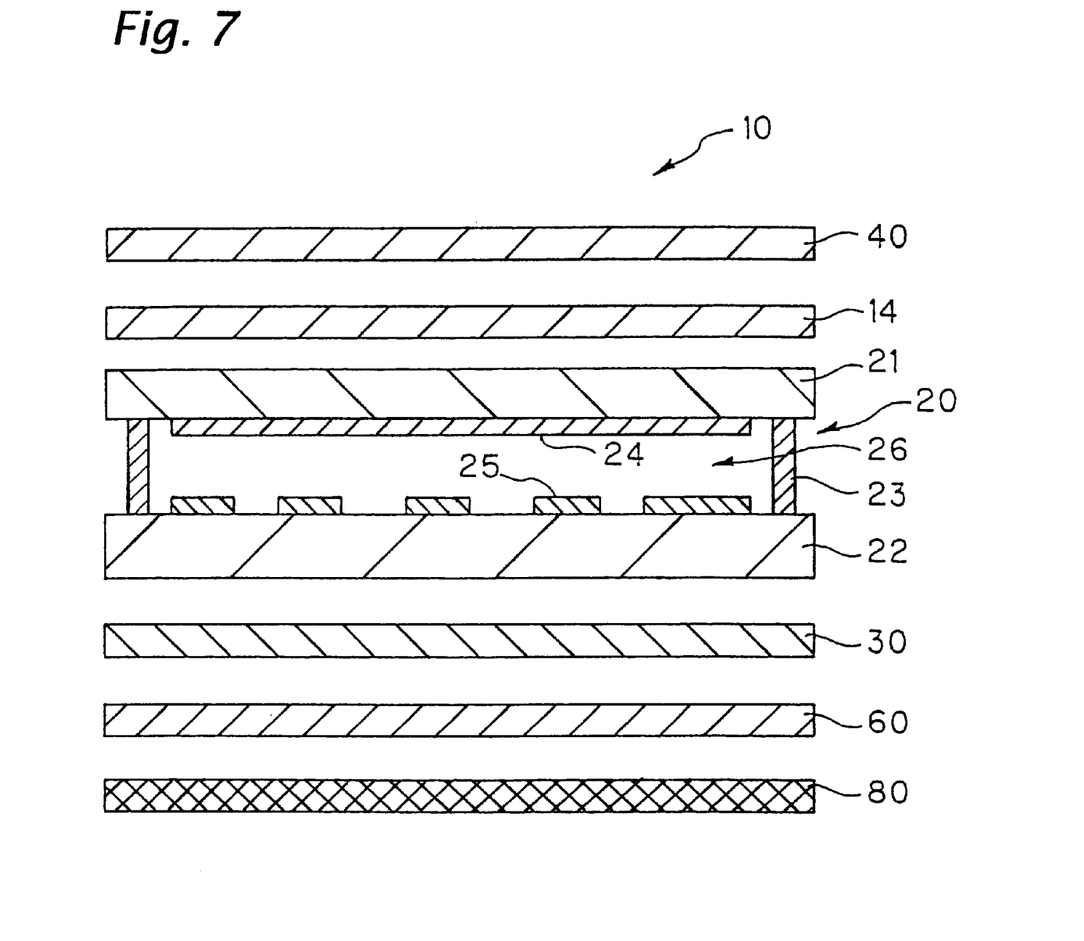
FIG. 7 is an exploded sectional view for explaining a liquid crystal display device of a third embodiment of the present invention.

A description will be given of a liquid crystal display device of a third embodiment of the present invention with reference to FIG. 7. FIG. 7 is an exploded sectional view for explaining the liquid crystal display device of the third embodiment of the present invention.

In the third embodiment, the position of the diffusing plate 30 in the above-described second embodiment was changed to between the STN cell 20 and the polarized light separator 60. In addition, a red color was set as the wavelength region ($-\Delta\lambda 3$) of the polarization separator 40. Other arrangements are the same as those of the second embodiment shown in FIG. 6.

According to the third embodiment, results similar to those of the above-described first embodiment were obtained and further, red-color display on the white background was obtained.

(Fourth Embodiment)

A description will be given of a liquid crystal display device of a fourth embodiment of the present invention, on the basis of the third embodiment.

In the fourth embodiment, the retardation film 14 in the above-described third embodiment was omitted. Other arrangements are the same as those of the third embodiment shown in FIG. 7.

According to the fourth embodiment, display was able to change to purple display on a yellow background.

(Fifth Embodiment)

Figure 8:
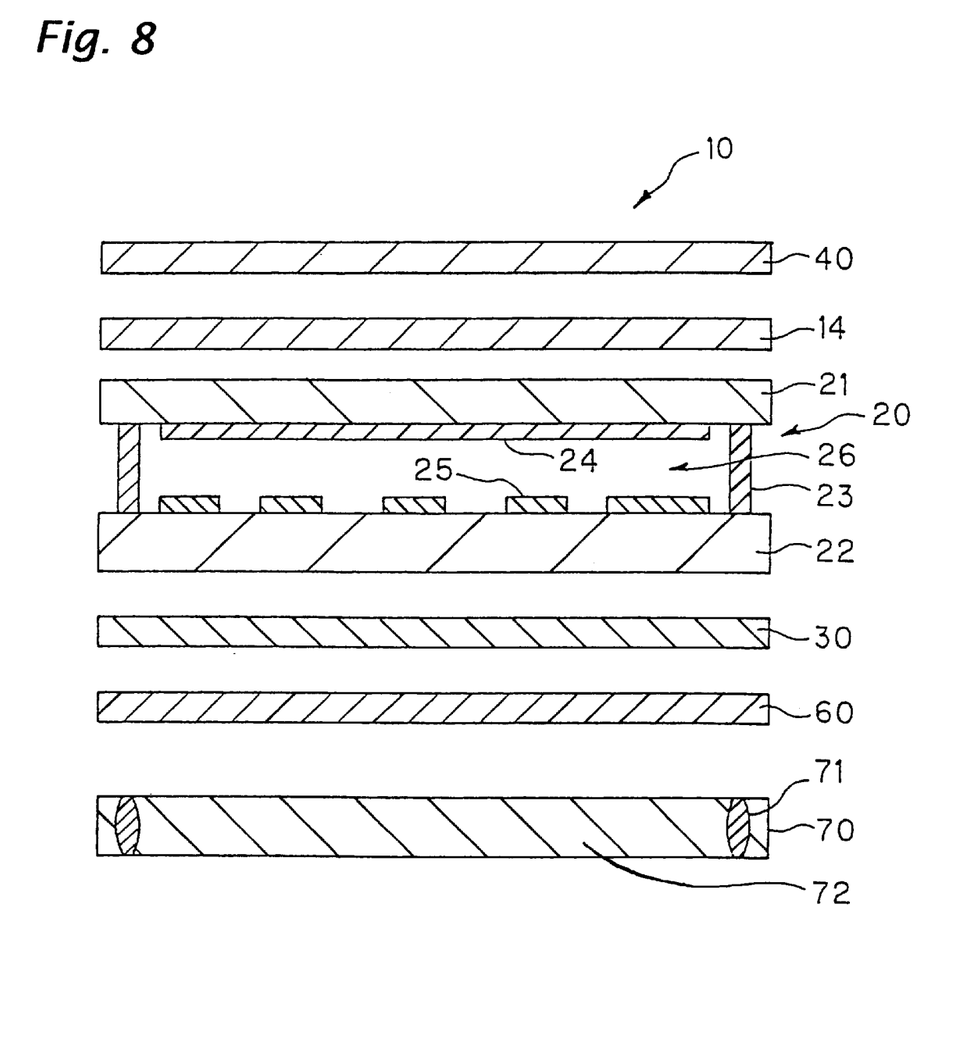
FIG. 8 is an exploded sectional view for explaining a liquid crystal display device of a fifth embodiment of the present invention.

A description will be given of a liquid crystal display device of a fifth embodiment of the present invention with reference to FIG. 8. FIG. 8 is an exploded sectional view for explaining the liquid crystal display device of the fifth embodiment of the present invention.

In the fifth embodiment, a light source 70 was provided in place of the light absorber 80 in the above-described third embodiment. The light source 70 employs an LED (Light Emitting Diode) 71, and emits light upward with a light guide 72. Other arrangements are the same as those of the third embodiment shown in FIG. 7.

According to the fifth embodiment, under external light, similarly to the above-described first embodiment, red display in the wavelength region ($-\Delta\lambda 3$) was obtained on the white background. In addition, under illumination of the light source, white display was obtained on the red background of the wavelength region ($-\Delta\lambda 3$).

(Sixth Embodiment)

The display device of the first embodiment of the present invention was incorporated into a portable phone. Bright color display was obtained even in sunshine, in the shade, or in a room.

Figure 9A:
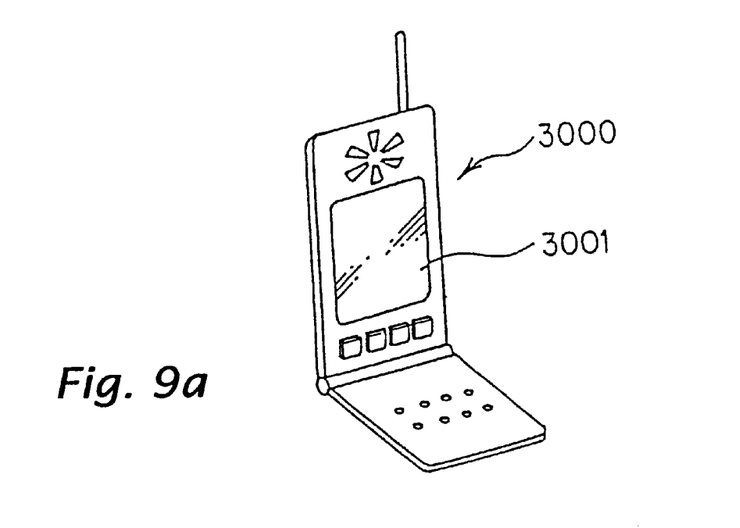
FIGS. 9(a), 9(b) and 9(c) are perspective views of embodiments of an electronic apparatus according to the present invention, respectively.
Figure 9B:
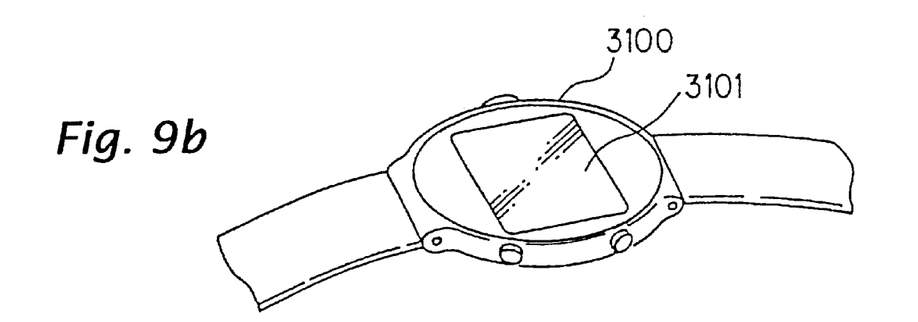
Figure 9C:
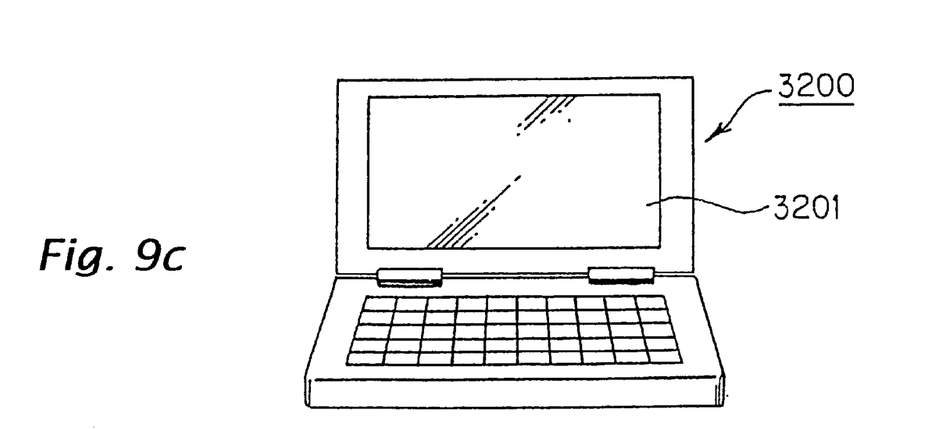

In addition, if the liquid crystal display device as described in the above respective embodiments is applied to, for example, a display section 3001 of a portable phone 3000 as shown in FIG. 9(*a*), an energy-saving-type portable phone for effecting bright reflective display can be realized. If applied to a display section 3101 of a wristwatch 3100 as shown in FIG. 9(*b*), an energy-saving-type wristwatch for effecting bright reflective display can be realized. In addition, if applied to a display screen 3201 of a personal computer 3200 as shown in FIG. 9(*c*), an energy-saving-type personal computer for effecting bright reflective display can be obtained.

In addition to the electronic apparatuses shown in FIG. 9, the liquid crystal display device of this embodiment can be applied to electronic apparatuses, such as a liquid crystal television, a viewfinder-type or a monitor-direct-view-type video tape recorder, a car navigation device, an electronic pocketbook, an electronic calculator, a word processor, an engineering work station (EWS), a television phone, a POS terminal, a device including a touch panel, and so forth.

As described above in detail, according to the respective embodiments, white light can be emitted and the light in the wavelength region $-\Delta\lambda$ can be emitted based on the external light in response to the state of the transmitted polarization axis of the TN liquid crystal 140, so that bright reflective display of letters, numeric characters and so forth in a desired color (for example, blue, red, black and so forth) can be effected on the white background. In addition, transmissive display can be also effected based on the light from the light source.

INDUSTRIAL APPLICABILITY

The display device according to the present invention is available as a bright reflective display device which employs a liquid crystal device as a variable transmission polarization axis means, and which uses external light, and further, is available as a display device which employs a variable transmission polarization axis means other than the liquid crystal device. In addition, an electronic apparatus according to the present invention is constructed with the use of such display devices, and is available as an energy-saving-type electronic apparatus and the like which can effect high-quality bright reflective display using external light.

What is claimed is:

1. A display device, comprising:

a variable transmission polarization axis means capable of varying a transmission polarization axis;

a first polarized light separating means which is placed on one side of said variable transmission polarization axis means, which transmits light of a linearly polarized light component in a first direction and which reflects, of the light of a linearly polarized light component in a predetermined direction different from said first direction, a component in a wavelength region $\Delta\lambda$ and transmits a component in a predetermined wavelength region different from said wavelength region $\Delta\lambda$; and a second polarized light separating means which is placed on another side of said variable transmission polarization axis means, which transmits light of a linearly polarized light component in a second direction, and which reflects or absorbs light of a linearly polarized light component in a predetermined direction different from said second direction.

2. The display device as claimed in claim 1, wherein said second polarized light separating means further comprises a polarizer which transmits light of a linearly polarized light component in said second direction and absorbs light of a linearly polarized light component in a direction perpendicular to said second direction.

3. The display device as claimed in claim 2, further comprising a reflecting means on a side opposite to said variable transmission polarization axis means with respect to said second polarized light separating means.

4. The display device as claimed in claim 1, wherein said first polarized light separating means further comprises a reflective polarizer which transmits light of a linearly polarized light component in said first direction, and which reflects light of the component in said wavelength region $\Delta\lambda$ in the linearly polarized light component in the direction perpendicular to said first direction.

5. The display device as claimed in claim 4, wherein said reflective polarizer further comprises a laminated product in which a first layer having birefringence and a second layer having a refractive index that is substantially equal to any one of a plurality of refractive indexes of said first layer, and having no birefringence are alternately laminated.

6. The display device as claimed in claim 1, wherein said second polarized light separating means further comprises a reflective polarizer which transmits light of a linearly polarized light component in said second direction, and which reflects light of a linearly polarized light component in the direction perpendicular to said second direction.

7. The display device as claimed in claim 6, wherein said reflective polarizer further comprises a laminated product in which a first layer having birefringence and a second layer having a refractive index that is substantially equal to any one of a plurality of refractive indexes of said first layer, and having no birefringence are alternately laminated.

8. The display device as claimed in claim 6, further comprising a light-absorbing means on a side opposite to said variable transmission polarization axis means with respect to said second polarized light separating means.

9. The display device as claimed in claim 1, further comprising a transmissive light-diffusing layer between said first polarized light separating means and said variable transmission polarization axis means.

10. The display device as claimed in claim 1, further comprising a transmissive light-diffusing layer between said variable transmission polarization axis means and said second polarized light separating means.

11. The display device as claimed in claim 1, further comprising a light source for illuminating said variable transmission polarization axis means.

12. The display device as claimed in claim 1, wherein said variable transmission polarization axis means further comprises a liquid crystal device.

13. The display device as claimed in claim 12, wherein said liquid crystal device further comprises a TN liquid crystal device, an STN liquid crystal device, or an ECB liquid crystal device.

14. An electronic apparatus comprising a display device as claimed in claim 1.

15. A display device comprising:

a variable transmission polarization axis device;

a first polarized light separator disposed on a first side of said variable transmission polarization axis device; and a second polarized light separator disposed on a second side of said variable transmission polarization axis device;

wherein said first polarized light separator transmits a first linearly polarized light component, reflects a second linearly polarized light component within a first wavelength region, and transmits said second linearly polarized light component within a second wavelength region, and wherein said second polarized light separator transmits a third linearly polarized light component and reflects or absorbs a fourth linearly polarized light component.

16. The display device of claim 15 further comprising a reflector disposed on a side of said second polarized light separator opposite said variable transmission polarization axis device.

17. The display device of claim 15 further comprising a light absorber disposed on a side of said second polarized light separator opposite said variable transmission polarization axis device.

18. The display device of claim 15 further comprising a transmissive light diffuser disposed between said variable transmissive polarization axis device and one of said first and second polarized light separators.

19. The display device of claim 15 further comprising a light source disposed proximate said variable transmission polarization axis device.

* * * * *

UNITED STATES PATENT AND TRADEMARK OFFICE
CERTIFICATE OF CORRECTION

PATENT NO. : 6,300,989 B1  Page 1 of 1
DATED : October 9, 2001
INVENTOR(S) : Chiyoaki Iijima It is certified that error appears in the above-identified patent and that said Letters Patent is hereby corrected as shown below:

<u>Title page,</u>
Item [57], ABSTRACT,
Line 8, "an other" should be -- another --.

<u>Column 5,</u>
Line 12, delete "a".

<u>Column 12,</u>
Line 1, delete "is".

Signed and Sealed this

Twenty-seventh Day of August, 2002

Attest:

Attesting Officer

JAMES E. ROGAN
*Director of the United States Patent and Trademark Office*